United States Patent
Sitter et al.

(10) Patent No.: US 8,605,033 B2
(45) Date of Patent: Dec. 10, 2013

(54) DISPLAY SYSTEM

(75) Inventors: Michael-Klaus Sitter, Pfinztal (DE); Serdar Gueltekin, Pforzheim (DE); Stefan Goering, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1439 days.

(21) Appl. No.: 11/837,136

(22) Filed: Aug. 10, 2007

(65) Prior Publication Data

US 2008/0036927 A1   Feb. 14, 2008

(30) Foreign Application Priority Data

Aug. 10, 2006   (EP) ..................................... 06016711

(51) Int. Cl.
*G02F 1/13*   (2006.01)

(52) U.S. Cl.
USPC ........................................................ 345/156

(58) Field of Classification Search
USPC ............................. 345/1.2, 104, 169, 204, 156
See application file for complete search history.

(56) References Cited

U.S. PATENT DOCUMENTS

| | | | | |
|---|---|---|---|---|
| 5,850,416 | A | 12/1998 | Myer | 375/221 |
| 6,118,426 | A | 9/2000 | Albert et al. | 345/107 |
| 2002/0003507 | A1* | 1/2002 | Dodge | 345/3.1 |
| 2002/0105507 | A1* | 8/2002 | Tranchina et al. | 345/204 |
| 2002/0167500 | A1 | 11/2002 | Gelbman | 345/204 |
| 2003/0156090 | A1* | 8/2003 | Munn et al. | 345/97 |
| 2004/0056856 | A1 | 3/2004 | Doi et al. | 345/208 |
| 2006/0020981 | A1* | 1/2006 | Paik | 725/81 |
| 2006/0071925 | A1 | 4/2006 | Wykoff et al. | 345/211 |
| 2006/0077045 | A1* | 4/2006 | Chen | 340/10.34 |
| 2006/0077165 | A1* | 4/2006 | Jang | 345/97 |
| 2006/0098094 | A1* | 5/2006 | Lott | 348/148 |
| 2006/0124897 | A1* | 6/2006 | Shingai et al. | 252/299.01 |
| 2006/0139283 | A1 | 6/2006 | Daum et al. | 345/98 |
| 2006/0294551 | A1* | 12/2006 | Cholewinsky | 725/75 |
| 2007/0015486 | A1* | 1/2007 | Marlowe | 455/345 |
| 2008/0062135 | A1* | 3/2008 | Meckesheimer et al. | 345/169 |

FOREIGN PATENT DOCUMENTS

| | | |
|---|---|---|
| WO | WO 2004/003687 A2 | 1/2004 |
| WO | WO 2006/020219 A2 | 2/2006 |

OTHER PUBLICATIONS

EP06016711.1-2225 Summons to attend oral proceedings pursuant to Rule 115(1) EPC; Nov. 15, 2012 (5 pgs.).

* cited by examiner

*Primary Examiner* — Quan-Zhen Wang
*Assistant Examiner* — Tony Davis
(74) *Attorney, Agent, or Firm* — Patterson & Sheridan, LLP

(57) ABSTRACT

A flat-screen display system is providing having a transmitting unit that includes a power supply, a display signal generating unit, a transmitter for transmission of the display signal and for transmission of the supplied power; and a receiving unit that includes a receiver for receiving the transmitted display signal and wirelessly coupling to the power supplied from the transmitter for power supply of the receiving unit, a control unit that decodes the received display signal, and a display that displays the decoded display signal.

32 Claims, 3 Drawing Sheets

DISPLAY SYSTEM

RELATED APPLICATIONS

This application claims priority of European Application Serial Number 06 016 711.6, filed on Aug. 10, 2006, titled DISPLAY; which application is incorporated in its entirety by reference in this application.

BACKGROUND OF THE INVENTION

1. Field of the Invention

This invention relates generally to electronic systems having a display and, more particularly, to flat-screen display systems. In various implementations, the invention may find application in display systems for use in vehicles.

2. Related Art

In recent years, electronic systems have become more and more sophisticated. The systems often include a display that conveys information to the user as well as allowing the user to control various functions of the electronic system. Flat-screen displays are now commonly used in many applications such as in television or computer systems to replace conventional cathode ray tubes. The flat screen display systems are generally based upon liquid crystal display technology or plasma display technology, although there are other display technologies as well. The use of flat screen displays in various electronic systems for vehicles has also increased in recent years. For example, many vehicles use navigation systems that guide the user from the user's starting position to a predetermined destination along a route selected by the system. Such navigation systems often provide information as to the proposed route of travel selected by the system as well as information about the route in the display.

One aspect that must be addressed in the design of electronic display systems is the type of communication that is to be used between components of the systems. A type of wireless communication is illustrated in transponder technology. Transponders include a transmitter and a responder, which function to receive and transmit radio signals over a prescribed frequency range. After receiving the signal, a transponder will broadcast a responsive signal at a different frequency. Transponders are used in satellite communications and they are also used for locating or identifying goods. The development of the transponder technology has been supported in particular by the radio frequency identification technology (RFID) used in a broad range of applications. The RFID technology in principle is similar to a coded identification. With RFID, electromagnetic or electrostatic coupling in the radio frequency portion of the electromagnetic spectrum is used to transmit signals. Accordingly, an RFID system includes an antenna and a transceiver that reads the radio frequency and transfers the information to a reading device, and a transponder or tag that in most cases is an integrated circuit containing the RF circuitry and the information to be transmitted.

With respect to flat-screen displays, liquid crystal displays may be made up of any number of color or monochrome pixels arrayed in front of a light source or reflector. Each pixel includes a column of liquid crystal molecules suspended between transparent electrodes and two polarizing filters, the axes of polarity of which are perpendicular to each other. By applying small electrical charges to transparent electrodes over each pixel, the molecules are twisted by electrostatic forces and this produces a twist of the light passing through the molecules to allow varying amounts of light to pass through the polarizing filters. The supply of electrical charges to the electrodes may be controlled by a printed circuit board that is electrically connected to the liquid crystal display. Electrical connection of the display to the printed circuit board may be achieved with an array of metal pins, heat seal connectors or conductive rubber connectors.

Providing a reliable connection between the display and the printed circuit board can, however, present certain problems. In some instances, mechanical or electrical contact may not be achieved during manufacturing. It is also possible that the electrical contact could be physically damaged, or that dust could interfere with the electrical connection. Furthermore, the electrical contacts of the display have to be aligned with a high accuracy to properly contact the receiving contacts of the printed circuit board to which the liquid crystal display is connected. As a consequence, the tolerances in the manufacturing process for the contact elements have to be low and this can result in the requirement for expensive manufacturing techniques.

Thus, a need exists to provide a display system in which a reliable connection between the display and the printed circuit board can be achieved in a manner allowing easy installation of the display and low manufacturing cost for the display system.

SUMMARY

Accordingly, in one example of an implementation, an electronic display system having a wireless connection between a transmitting unit and a receiving unit is provided. The transmitting unit includes a power supply, a display signal generating unit and a transmitter for wireless transmission of the display signal and wireless transmission of the supplied power. The receiving unit includes a receiver receiving the transmitted display signal and wirelessly coupling to the power supplied from the transmitter to provide the power supply to the receiving unit. The receiving unit further includes a control unit that decodes the received display signal and a display that displays the decoded display signal. The display signal may include information other than label information, where label information is identification and other information about an item that is usually in close proximity to the display. Although some electronic display systems are designed to display label information such as bar code, image, price, product description or other information about a product on a supermarket shelf, the electronic display systems of the present invention are designed to display at least some information other than label information such as, for example may be the case in a vehicle navigation system, a multimedia entertainment system, a DVD player and the like. In some implementations, the power may be continuously supplied to the receiving unit by wireless transmission from the transmitter. Such implementations may be applicable to display systems that constantly use power such as a multicolor liquid crystal display in which power is continuously supplied to the receiving unit.

In another example of an implementation, a display system is provided that includes a transmitting unit that includes a means for supplying the power, a means for generating a display signal and a means for transmitting power and the display signal in the form of electromagnetic waves. The display system further includes a receiving unit that includes a means for receiving power and a display signal in the form of electromagnetic waves, a means to decode the received display signal and a means to display information corresponding to the decoded display signal. When displaying information, the receiving unit receives power in the form of electromagnetic waves during at least 50% of the time the information is displayed. The display signal may include information other than label information, where label information is identification and other information about an item that is usually in close proximity to the display.

In another example of an implementation, a vehicle electronic system is provided. The vehicle electronic system includes a base unit mounted in a vehicle and the base unit in turn includes a transmitting unit with a power supply, a display signal generating unit for generating a display signal, a transmitter and an antenna for wireless transmission of the display signal and for transmission of power. The vehicle electronic system furthermore includes a receiving unit mounted in the vehicle, the receiving unit including a receiver receiving the transmitted display signal and wirelessly coupling to the power supplied from the transmitter for power supply of the receiving unit, a control unit decoding the received display signal, and a display displaying the decoded display signal.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
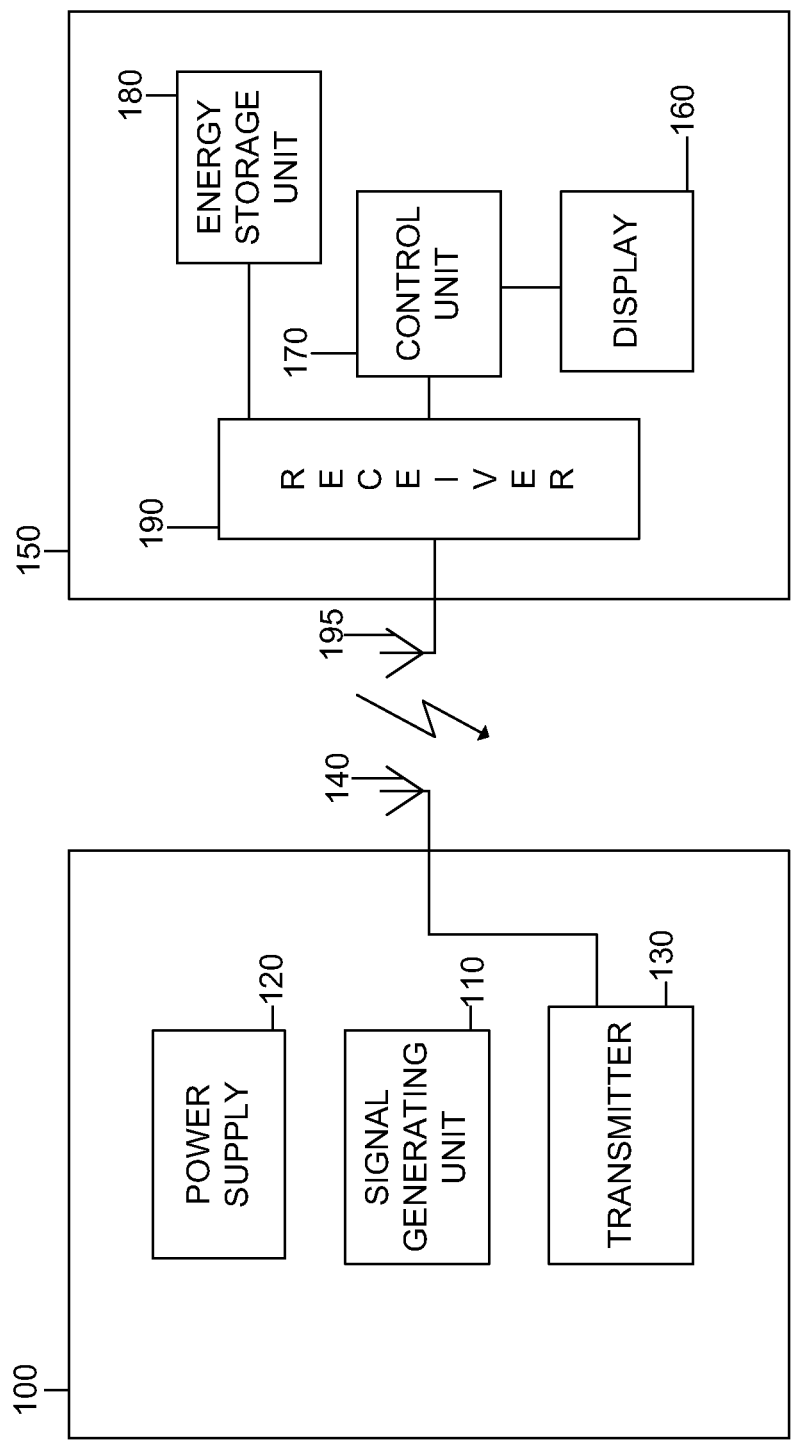
FIG. 1 is a schematic block diagram of a display system that includes a transmitting unit and a receiving unit.
Figure 2:
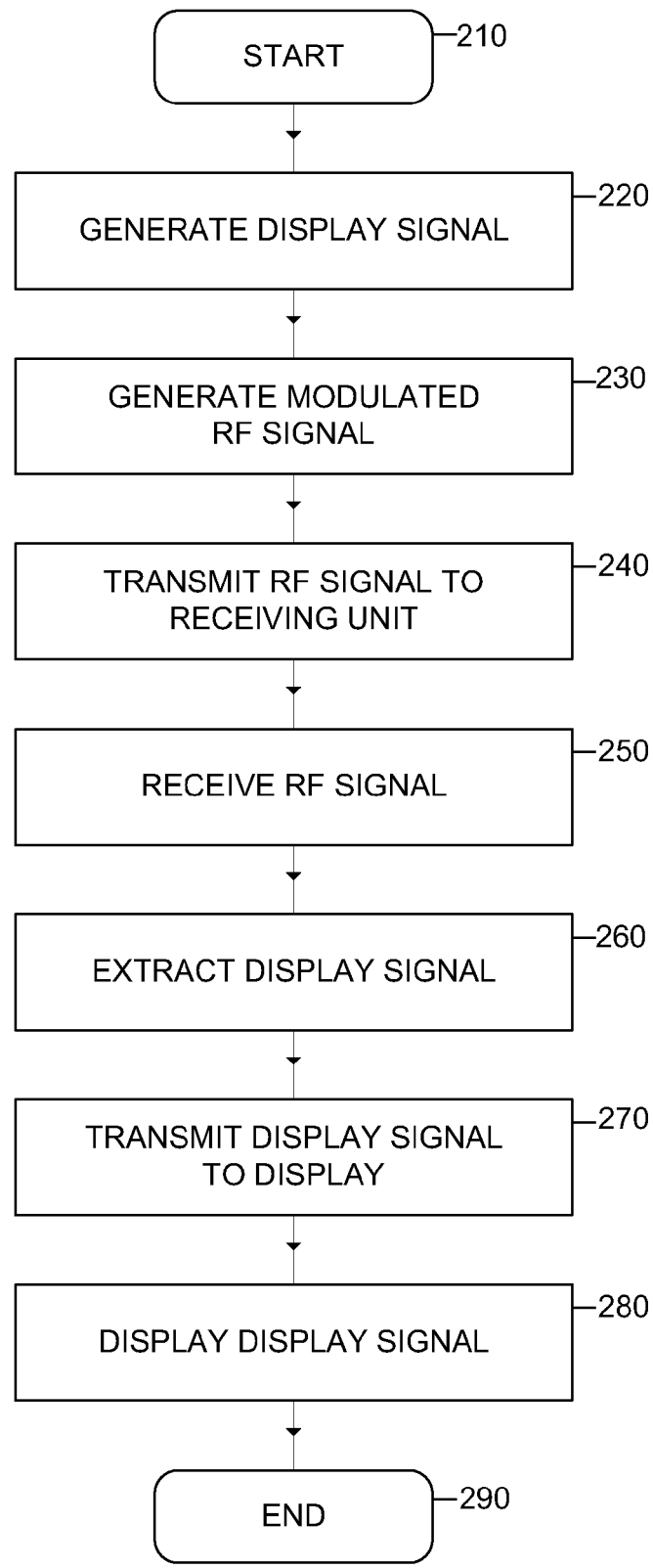
FIG. 2 is a flowchart illustrating the steps for a method for displaying a signal in the display system of FIG. 1.
Figure 3:
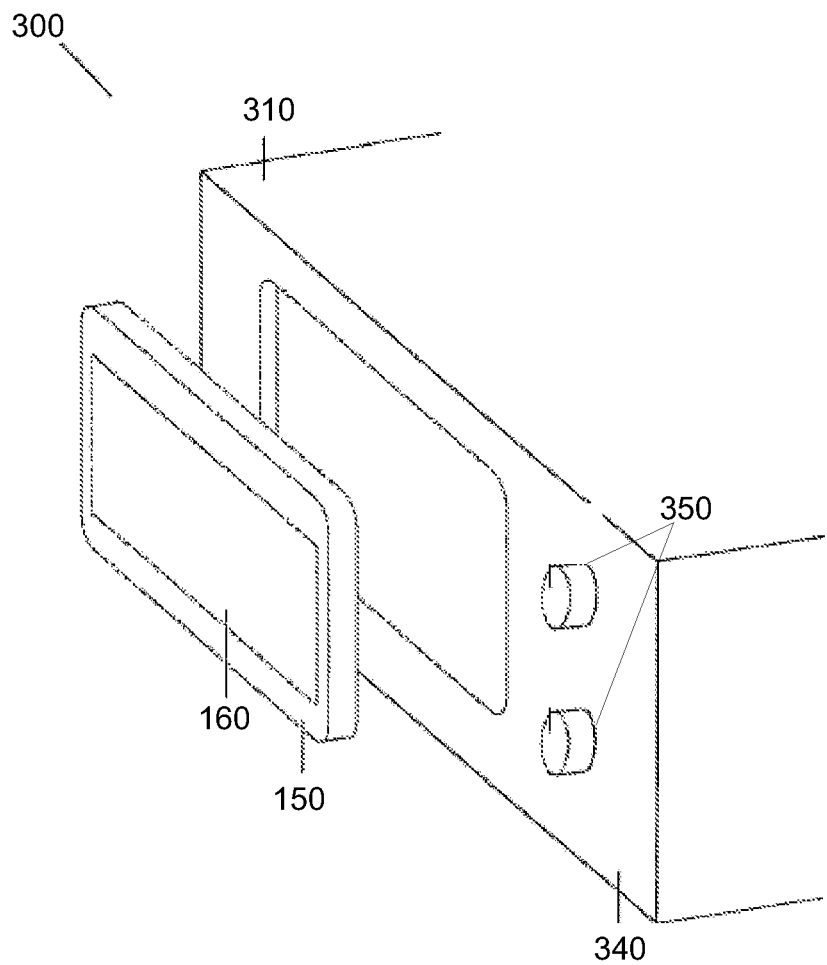
FIG. 3 is a schematic perspective view of a vehicle electronic system that includes a receiving unit with a display.

FIGS. 1-3 illustrate various examples of implementations of display systems of the present invention. In particular, FIG. 1 illustrates a display system having a transmitting unit 100 and a receiving unit 150. The transmitting unit 100 may be part of a printed circuit board provided in an electronic system. The transmitting unit 100 further includes a display signal generating unit 110 that generates the signals to be displayed. The system shown in FIG. 1 may, in various implementations, be a liquid crystal display system. In such systems an array of signals may be generated using a signal protocol, the protocol including the different control signals for each pixel of the liquid crystal display. Furthermore, a power supply 120 is provided that supplies power to the transmitting unit 100. A transmitter 130 is provided for wireless transmission of a generated display signal to the receiving unit 150. The transmitter 130 is connected to antenna 140, which emits a modulated radio frequency signal, which includes the display signal information. In addition, the radio frequency signal provides an energy field, which supplies power to the components of the receiving unit 150. Transmission of energy from the transmitter 130 to the receiver 190 of the receiving unit 150 may be achieved by an electromagnetic or electrostatic coupling of the transmitter 130 to the receiver 190. In the example of an implementation shown in FIG. 1, the coupling may be an inductive coupling and as a result of the inductive coupling, the antenna 195 of the receiving unit 150 receives the transmitted radio frequency signal from the transmitting unit 100. Thus, in an example of an implementation shown in FIG. 1, the display signal and the power may be wirelessly transmitted via a radio frequency signal.

In various implementations, the transmitter 130 may transform the display signal and the supplied power in an energy field transmitted to the receiver 190 of the receiving unit 150. The receiver 190 thus receives the transmitted energy field and extracts the display signal and the received power to provide the power supply to the receiving unit 150.

The receiving unit 150 thus includes a receiver 190, which receives the transmitted radio frequency signals. The received radio frequency signal is then transmitted to a control unit 170 where the received signal is decoded and the display signal is then transmitted to the display 160. In various implementations, the display 160 may be a liquid crystal display and the liquid crystal display may have a diagonal size of from about 0.04 meters to about 0.5 meters and an aspect ratio in the range between about 1:1 and about 10:1. In various implementations in which the display is a liquid crystal display, the display may be rigid and non-flexible liquid crystal display. In various other implementations, the display may be a flexible liquid crystal display.

The receiving unit 150 operates on the energy received from the energy field provided by the power supply 120 of the transmitting unit 100. In this context, the power supply 120 corresponds to a power supply in transponder technology as described above except that the received power in the display system drives the control unit 170, which decodes the received display signal. The control unit 170 may not only decode the received display signal, but, in various implementations, it may also control all aspects of the display 160, i.e. the energizing of the display, the power management and the signal decoding. The display 160 may then function to display the decoded display signal received from the control unit 170.

In addition to receiving power from the transmitting unit 100, the receiving unit 150 may also contain an energy storage unit 180 for storing the energy received from the transmitting unit 100. The storage unit 180, however, may not include a power supply as provided in the transmitting unit 100, but instead, the storage unit 180 may simply store the received energy for further usage.

The storage unit 180 may be particularly applicable in display systems using liquid crystal displays. Generally, these displays use only very small amounts of electric power so that the energy extracted from the radio frequency signal is sufficient to drive the receiver 190, the control unit 170 and the display 160. In such implementations, the energy storage unit 180 may function to store the energy received from the antenna 195. The energy storage unit 180 may then be used when energy is needed in the receiving unit 150, but no signal is received from the transmitting unit 100. In one example of an implementation, the energy storage unit 180 may be a rechargeable battery.

In various implementations, the transmitter 130 may transmits a modulated radio frequency signal containing the display signal to the receiving unit 150. In liquid crystal displays, a signal is needed for each transistor and pixel in the display. In various implementations in which the display 160 is a liquid crystal display, the display signal may be transmitted as serial data in a communication protocol to the receiving unit 150, which then decodes the protocol and transmits the decoded display signal to each of the transistors of the liquid crystal display. For transmitting the radio frequency signal, the transmitter 130 may be connected to an antenna 140. The antenna 140 may be a track of the printed circuit board, however, any other method of providing antenna 140 in the transmitting unit 100 may be used. In the receiving unit 150, antenna 195, which is connected to receiver 190, may be a conductor incorporated into a glass structure of the liquid crystal display. However, it is also possible that the antenna 195 of the receiving unit 150 may be a conductive paste on the glass surface of the liquid crystal display. Furthermore, a conventional antenna that is not integrated in one of the components may also be used.

The frequency of the radio frequency signal used for transmitting the signal and the energy may depend upon the distance provided between the transmitting unit 100 and the receiving unit 150 for a particular display system. Thus, the transmitting and receiving antennas 140 and 195 may be positioned so as to achieve optimal coupling between the antennas for the particular display system. For example, the distance between the transmitting unit 100 and the receiving unit 150 may be in the range of from about 0 to about 100 millimeters up to about 4 meters or more depending upon the requirements of the particular display system. Positioning the two antennas closer to each other may result in greater transmission of energy and positioning the two antennas further from each other may result in weaker transmission of energy. Thus, for display systems requiring only low levels of energy, the distance between antennas may be greater and for display systems requiring higher levels of energy, the distance between antennas may be lesser.

In some implementations requiring little power, the receiving unit 150 with antenna 195 may be located within about four meters of the transmitting unit 100 with antenna 140. For example, in certain implementations the display system may be adapted for use in a vehicle and the transmitting unit 100 may be located at some convenient location in the vehicle such as under the dashboard or in the glove box while the receiving unit 150 with display 160 may be located in a different location such as on a headrest. Thus, in various implementations, the receiving unit 150 may be readily mounted in a position remote from the transmitting unit 100.

In other implementations, the receiving unit 150 may located within a distance of from about 0 meters to about 0.1 meters from the transmitting unit 100. A distance of about 0 meters means that the receiving unit 150 is in physical contacting with the transmitting unit 100. Such a close arrangement of from about 0 meters to about 0.1 meters will result in effective power transmission between the transmitting unit 100 and the receiving unit 150. An example of such an implementation in a vehicle display system, is a vehicle navigation system in which the receiving unit 150 with the display 160 is not physically connected to the navigation system, which includes the transmitting unit 100. The receiving unit 150 with display 160 may, thus, be remote from the navigation system with the transmitting unit 100 in various implementations.

In another implementation, control unit 170 of the receiving unit 150 may be mounted to the glass structure of the liquid crystal display using the chip-on-glass technology. In chip-on-glass technology, bonding and connection techniques are used in which the different electrical connections from the control unit 170 that receives the display signal and sends a signal to each of the transistors controlling the pixels, are integrated into the glass structure of the liquid crystal display.

In still another example of an implementation of the invention, the control unit 170 and the receiver 190 may both be integrated into the liquid crystal display. In this case, the controlling of the display 160, the decoding of the received signal and the controlling of the power supply received by antenna 195 may all be incorporated into one chip on the glass structure of the display 160 using the chip-on-glass technology. Furthermore, these functions may also be performed by conventional printed circuit boards on conventional electronic components.

In certain implementations, the display system may be a vehicle electronic display system such as a vehicle navigation system. In certain implementations of a vehicle electronic display system, the display 160 may be designed as a removable display which may be easily removed from the display system by the user. This may be possible in some implementations, because of the wireless connection between transmitting unit 100 and the receiving unit 150.

In some implementations of the invention, the power may be continuously supplied to the receiving unit 150 by the wireless transmission from the transmitter 130 to the receiver 190. Referring to FIG. 1, this may be, for example, achieved by a continuous emission of radio frequency radiation by the antenna 140 of the transmitting unit 100, which is received by antenna 195 of receiving unit 150. This implementation may be particularly useful for displays which require a constant or nearly constant supply of power to the display 160 to maintain a continuous display of information. The display 160 may, for example, be a back-illuminated liquid crystal color display, which requires a constant power supply. In such systems, the energy storage unit 180 may assist in providing the energy supply in case of an interruption in the transmitted power.

A continuous power supply may also be required for a display that is updated during operation. By way of example, the display may be updated in operation at a frequency of from about 1 Hz to about 150 Hz. Some applications, such as a display for a radio system, or a navigation system, may only require low update rates, however, applications such as displays for video games or DVD players may require rather high update rates. It may be comfortable to watch a movie with the update rate of from about 15 Hz to about 100 Hz, however, for video games, faster update rates may be required.

In another implementation, a display system is provided that includes a transmitting unit 100 and a receiving unit 150. The receiving unit 150 includes means for receiving power and the display signal in form of electromagnetic waves, means to decode the received display signal and means to display information corresponding to the decoded display signal. The means to display information of the receiving unit 150 may be in the form of a liquid crystal display, such as an active or passive matrix liquid crystal display, a thin film transistor liquid crystal display, or any other display, such as a fluorescent display, a digital light processing display, a plasma display, a light-emitting diode display, an organic light-emitting display, a field emission display or a liquid crystal-on-silicon display, or other displays. In various implementations, the "display", "display means" or "means to display" may be rigid and non-flexible displays. In other implementations the "display", "display means" or "means to display" may be flexible displays.

In one aspect of this implementation, the receiving unit 150 may receive power during operation, in form of electromagnetic waves during at least 50% of the time the information is displayed. The means to display information may still display information during the time no energy is received, as energy may be temporarily stored in a storage unit, such as the energy storage unit 180 in the receiving unit 150. With such a configuration, if the transmission from the transmitting unit 100 to the receiving unit 150 is interrupted, information may still be displayed. Alternatively, the receiving unit 150 may receive power in form of electromagnetic waves during at least 80% of the time information is displayed. The display signal may be supplied to the receiving unit 150 from at least about once every second up to continuously supplying the display signal. Thus, the display signal may be supplied every time the information to be displayed on the means to display information is updated, or it may be continuously supplied even if the information to be displayed does not change. The display signal may, for example, be supplied with a frequency corresponding to the update frequency of the means to display information.

In another implementation, a receiving unit for displaying information is provided which corresponds to the receiving unit 150 in FIG. 1. In such a receiving unit, a wireless connection may be established between the receiving unit 150 and the transmitting unit 100 as shown in FIG. 1 such that the receiving unit 150 receives both power and a display signal over the wireless connection. The display signal may be decoded by a control unit 170 and displayed on the display 160 as shown in FIG. 1 and the display 160 may be a liquid crystal display as discussed above. Such a receiving unit may be versatile, in that it may be used to establish a wireless connection with a wide variety of transmitting units. In various implementations of the present invention, a back-illuminated crystal display may be used as one possible example of a liquid crystal display. In this and other implementations, it may be advantageous that the wireless connection between the receiving unit and the transmitting unit be established for at least 50% of the time during operation. In this case, energy may be transferred to the receiving unit during at least 50% of the operation time. In various implementations, the liquid crystal display may, however, require a constant or nearly constant supply of power, and in such instances, an energy storage unit 180 such as shown in FIG. 1 may be provided to ensure a continuous power supply to the display 160.

FIG. 2 is a flowchart showing the different steps for displaying a signal on the display 160 of FIG. 1. After the start of the process in step 210, the display signal may be generated in the signal generating unit in step 220. As discussed in connection with FIG. 1, the signal may in some implementations, be a serially transmitted signal transmitted by a predetermined protocol. In step 230 a modulated RF signal may be generated that includes the information of the generated display signal. This RF signal may then be transmitted to the receiving unit in step 240, the signal being received in the receiving unit in step 250. In the receiving unit the display signal may then be extracted in the control unit in step 260, the control unit being driven by the energy extracted from the transmitted RF signal. After the signal extraction the display signal may be transmitted to the display in step 270, and finally, in step 280 the decoded display signal may be displayed on the display. The process ends in step 290.

In FIG. 3 illustrates a schematic perspective view of a vehicle electronic system 300. The system includes a base unit 310, which is mounted in a vehicle. The base unit 310 may contain the components as illustrated in the schematic block diagram of FIG. 1 including a transmitting unit that includes a power supply, a signal generating unit, a transmitter and an antenna, which are not shown in the schematic perspective view of FIG. 3. The vehicle electronic system 300 further includes a receiving unit 150, which may contain components as illustrated in the schematic block diagram of FIG. 1 including a receiver and a control unit, which are not shown in the schematic perspective view of FIG. 3. The receiving unit 150 further includes a display 160 that displays the decoded display signal.

In one implementation of a vehicle display system, the base unit 310 may be mounted in the dashboard of the vehicle and to this a face plate 340 is attached. To the face plate, the receiving unit 150 is mounted. In some implementations, the receiving unit 150 may be detachably mounted to the face plate 340 of the base unit 310. In other implementations, the receiving unit 150 may be mounted by means of a support structure, so that it cannot be removed from the base unit. In one implementation, the support structure may be formed so that it enables the display to pivot. In each of these implementations, the mounting of the receiving unit 150 to the face plate 340 of the base unit 310 results in the energy transfer between the base unit 310 and the receiving unit 150 being rather effective, since the distance between both units is very small, for example, from about 0 to about 0.1 meters. In another implementation, the receiving unit 150 may be mounted further away from the base unit 310, for example, in a headrest of the vehicle or in some other location remote from the base unit. The face plate 340 of the base unit 310 may furthermore include control elements 350 as shown in FIG. 3. It is to be understood, however, that FIG. 3 is only a schematic perspective drawing of a vehicle electronic system, and that the vehicle electronic system may take on different shapes and configurations. The vehicle electronic system 300 may for example be a navigation system or a car stereo or an in-dash multimedia system, or an in-dash or overhead DVD player, or a combination of these. Furthermore, in some implementations, various changes and modifications may be made and different aspects of implementations described above may be combined. For example, the receiving unit 150 of the implementation of FIG. 3 may be provided with a control unit 170 formed using chip-on-glass technology or with an antenna 195 as described with respect to the implementation in FIG. 1.

The display systems of this invention as illustrated in FIGS. 1-3, provide for a receiving unit 150 that is wirelessly coupled to the transmitting unit 100. As a result, in some implementations, the display may be easily removed from the support structure to which the display is mounted. Additionally, the wireless receiving unit 150 may be protected more from electrostatic discharge than are conventional display systems, which are electrically connected to the signal generating unit 110. Furthermore, there are no contacts connecting the display 160 to the signal generating unit 110 and, hence, no possible deterioration of such contacts, which may occur with conventional display system in which the unit transmitting the signal is physically connected to the unit receiving the signal. Moreover, it is possible to completely seal the transmitting unit 100 and the receiving unit 150 to render them waterproof so that in certain implementations, the display systems may be exposed to the environment such as on a motorbike.

The foregoing description of implementations has been presented for purposes of illustration and description. It is not exhaustive and does not limit the claimed inventions to the precise form disclosed. Modifications and variations are possible in light of the above description or may be acquired from practicing the invention. For example, persons skilled in the art will understand and appreciate, that one or more processes, sub-processes, or process steps described in connection with FIGS. 1-4 may be performed by hardware and/or software. Additionally, a display system, as described above, may be implemented in software that would be executed within a processor or plurality of processor in a networked environment. Examples of a processor include but are not limited to microprocessor, general purpose processor, combination of processors, DSP, any logic or decision processing unit regardless of method of operation, instructions execution/system/apparatus/device and/or ASIC. If the process is performed by software, the software may reside in software memory (not shown) in the device used to execute the software. The software in software memory may include an ordered listing of executable instructions for implementing logical functions, i.e., "logic" that may be implemented either in digital form such as digital circuitry or source code or optical circuitry or chemical or biochemical in analog form such as analog circuitry or an analog source such an analog electrical, sound or video signal, and may selectively be embodied in any signal-bearing (such as a machine-readable and/or computer-readable) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium," "computer-readable medium," and/or "signal-bearing medium" (hereinafter, "signal-bearing medium") is any means that may contain, store, communicate, propagate, or transport the program for use by or in connection with the instruction execution system, apparatus, or device. The signal-bearing medium may selectively be, for example but not limited to, an electronic, magnetic, optical, electromagnetic, infrared, or semiconductor system, apparatus, device, air, water, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" "DVD" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. Additionally, it is appreciated by those skilled in the art that a signal-bearing medium may include carrier wave signals on propagated signals in telecommunication and/or network distributed systems. These propagated signals may be computer, i.e., machine data signals embodied in the carrier wave signal. The computer/machine data signals may include data or software that is transported or interacts with the carrier wave signal. Note also that the implementation may vary between systems. The claims and their equivalents define the scope of the invention.

What is claimed is:

1. A display system comprising:
    a transmitting unit comprising:
        a power supply configured to supply power to a display;
        a display signal generating unit configured to generate a display signal; and
        a transmitter in communication with the power supply and the display signal generating unit, the transmitter configured to combine the display signal and the power for the display into a modulated frequency signal and further configured to continuously transfer the modulated frequency signal wirelessly to a receiving unit via an energy field; and
    the receiving unit comprising:
        a receiver configured to receive the modulated frequency signal from the transmitting unit and extract the power from the modulated frequency signal;
        a control unit configured to receive the modulated frequency signal from the receiver and decode the display signal from the modulated frequency signal; and
        the display configured to receive the decoded display signal and the power from the modulated frequency signal and in response, continuously update displayed content based on the decoded display signal; and
        where the power extracted by the receiver is used to power the control unit and the display.

2. The display system of claim 1, where the display system is a vehicle display system.

3. The display system of claim 1, where the display is a rigid, non-flexible liquid crystal display.

4. The display system of claim 1, where the modulated frequency signal is a radio frequency signal and where the transmitter includes an antenna configured to emit the radio frequency signal and the receiver includes an antenna configured to receive the radio frequency signal.

5. The display system of claim 4, where the antenna of the transmitter is a printed circuit board track.

6. The display system of claim 4, where the antenna of the receiver is a conductor incorporated into a glass structure of the display.

7. The display system of claim 4, where the antenna of the receiver is a conductive paste on a glass surface of the display.

8. The display system of claim 1, where the display is a removable display which can be removed from a support structure of the receiving unit.

9. The display system of claim 1, where the control unit of the receiver unit is mounted to a glass structure of the display using a chip-on-glass technology.

10. The display system of claim 1 wherein the receiving unit further comprises an energy storage unit coupled to the receiver, the energy storage unit configured to store the power extracted from the modulated frequency signal wherein energy stored at the energy storage unit is used to power the control unit and the display when the receiver is not receiving the modulated frequency signal from the transmitting unit.

11. A display system, comprising:
    a transmitting unit, the transmitting unit comprising a power supply configured to supply power to a receiving unit, a display signal generating unit configured to generate a display signal, and a transmitter configured to generate an induction field that continuously radiates an electromagnetic wave comprising the display signal and power supplied by the power supply, where the power is sufficient to run the receiving unit; and
    a receiving unit located in the induction field, configured to separate the power and the display signal in the electromagnetic wave a control unit configured to receive and decode the display signal and a display configured to receive the decoded display signal from the control unit and the separated power to display information corresponding to the decoded display signal, where the display signal comprises information updated continuously.

12. The display system of claim 11, where the display is configured to cease to display information when the wireless transmission from the transmitter to the receiver is stopped.

13. The display system of claim 11, where the display is updated in operation with a frequency from about 1 Hz to about 150 Hz.

14. The display system of claim 11, where the receiver or the control unit or both are mounted to a glass structure of the display using a chip-on-glass technology.

15. The display system of claim 11, where the display is a back illuminated liquid crystal color display.

16. The display system of claim 11 wherein the receiving unit further comprises an energy storage unit coupled to the receiver, the energy storage unit configured to store the power extracted from the modulated frequency signal wherein energy stored at the energy storage unit is used to power the control unit and the display when the receiver is not receiving the modulated frequency signal from the transmitting unit.

17. The display system of claim 11, where, in operation, the display signal is continuously provided to the receiving unit that includes the display.

18. A display system for displaying information, comprising:
a transmitting unit comprising means for supplying power, means for generating display content and means for transmitting a combination of the power and the display content in the form of a single electromagnetic wave;
a receiving unit comprising means for continuously receiving the single electromagnetic wave comprising the display content and the power for operation of means to decode the display content and means to display the display content, means for separating the power and the display content in the electromagnetic wave the means to decode the received display content and the means to display information corresponding to the decoded display content by using the power from the electromagnetic wave.

19. The display system of claim 18, where the receiving unit is configured to receive power in form of electromagnetic wave during at least 50% of the time information is displayed.

20. The display system of claim 18, where in operation, the receiving unit is located within at least 4 m of the transmitting unit.

21. The display system of claim 18, where in operation, the receiving unit is located within a distance of from about 0 m to about 0.1 m from the transmitting unit.

22. The display system for displaying information of claim 18 wherein the receiving unit further comprises a means for storing energy, the means for storing energy configured to store the power extracted from the modulated frequency signal wherein energy stored at the means for storing energy is used to power the means to decode the received display content and the means to display information corresponding to the decoded display content.

23. The display system of claim 18, where the display content is supplied to the receiving unit at least once every second.

24. A receiving unit for displaying information, where a wireless connection is established between the receiving unit and a transmitting unit, the receiving unit wirelessly receiving power and a display signal over the wireless connection as part of a modulated frequency signal, the power being extracted from the modulated frequency signal by means of a receiver and the display signal being decoded by means of a control unit and displayed on a liquid crystal display comprised in the receiving unit, where the display signal comprises information other than label information and where the liquid crystal display is continuously updated by the display signal and the power extracted from the modulated frequency signal, and further the power is used to power the control unit.

25. The receiving unit of claim 24, where the liquid crystal display has a diagonal size in the size range between about 0.04 m and about 0.5 m and an aspect ratio in range between about 1:1 and about 10:1.

26. The receiving unit for displaying information of claim 24 further comprising an energy storage unit coupled to the receiver, the energy storage unit configured to store the power extracted from the modulated frequency signal wherein energy stored at the energy storage unit is used to power the control unit and the liquid crystal display when the receiver is not receiving the modulated frequency signal from the transmitting unit.

27. The receiving unit of claim 24, where the wireless connection between the receiving unit and the transmitting unit is established for at least 50% of the time during operation.

28. A vehicle electronic system, comprising:
a base unit mounted in a vehicle, the base unit comprising a transmitting unit with a power supply configured to supply power, a display signal generating unit configured to generate a display signal, a transmitter coupled to the power supply and the display signal generating unit, and an antenna coupled to the transmitter configured to transmit a continuous wireless transmission of a modulated frequency signal comprising the display signal and power supplied by the power supply;
a receiver configured to receive the modulated frequency signal from the transmitting unit and extract the power of the modulated frequency signal, a control unit configured to receive the modulated frequency signal from the receiver and decode the display signal of the modulated frequency signal, and a display configured to receive the decoded display signal from the control unit and display the decoded signal, where the power extracted from the modulated frequency signal is used to power the control unit and the display, and where an image displayed on the display is updated substantially at real time based on the continuous wireless transmission of the modulated frequency signal.

29. The vehicle electronic system of claim 28, where the base unit is mounted in the dashboard of the vehicle and includes a face plate to which the receiving unit is mounted.

30. The vehicle electronic system of claim 29, where the receiving unit is detachably mounted to the face plate of the base unit.

31. The vehicle electronic system of claim 28, where the vehicle electronic system is a navigation system, or a car stereo, or an in-dash multimedia system, or an in-dash or overhead DVD-player, or a combination thereof.

32. The vehicle electronic system of claim 28 where the receiving unit further comprises an energy storage unit coupled to the receiver, the energy storage unit configured to store the power extracted from the modulated frequency signal wherein energy stored at the energy storage unit is used to power the control unit and the display when the receiver is not receiving the modulated frequency signal from the transmitting unit.

* * * * *